(12) United States Patent
Lemperiere

(10) Patent No.: US 6,337,524 B1
(45) Date of Patent: Jan. 8, 2002

(54) GEAR MOTOR ACTIVATING A MOTOR VEHICLE FUNCTIONAL MEMBER

(75) Inventor: Marianne Gabrielle Lemperiere, Caen (FR)

(73) Assignee: Meritor Light Vehicle Systems —France, Sully sur Loire (FR)

( * ) Notice: Subject to any disclaimer, the term of this patent is extended or adjusted under 35 U.S.C. 154(b) by 0 days.

(21) Appl. No.: 09/446,772

(22) PCT Filed: Dec. 23, 1998

(86) PCT No.: PCT/FR99/01318

§ 371 Date: Jul. 3, 2000

§ 102(e) Date: Jul. 3, 2000

(87) PCT Pub. No.: WO98/59408

PCT Pub. Date: Dec. 30, 1998

(30) Foreign Application Priority Data

Jun. 24, 1997 (FR) .............................. 97 07865

(51) Int. Cl.⁷ ................................ H02K 7/10
(52) U.S. Cl. .................. 310/75 R; 310/68 B; 310/98
(58) Field of Search .................. 310/75 R, 68 B, 310/68 R, 83, 98, 99

(56) References Cited

U.S. PATENT DOCUMENTS

| | | | | |
|---|---|---|---|---|
| 3,796,899 A | * | 3/1974 | Giachello | 310/156 |
| 4,499,420 A | * | 2/1985 | Shiraki et al. | 324/174 |
| 4,642,496 A | * | 2/1987 | Kerviel et al. | 310/68 B |
| 4,935,652 A | * | 6/1990 | Maxa | 310/68 B |
| 5,184,038 A | * | 2/1993 | Matsui et al. | 310/42 |
| 5,565,721 A | * | 10/1996 | Knappe | 310/68 B |

* cited by examiner

Primary Examiner—Nestor Ramirez
Assistant Examiner—Thanh Lam
(74) Attorney, Agent, or Firm—Carlson, Gaskey & Olds

(57) ABSTRACT

A geared motor is used control the movement of a vehicle member, such as a window. A reducer casing is arranged at one end of the motor and includes a sensor assembly for detecting the speed and direction of rotation of the motor. The sensor assembly includes a coded magnetic wheel and Hall effect cells that arc positioned between the wheel and a member for concentrating magnetic flux. The Hall effect cells are placed opposite from a lateral face of the wheel and are spaced apart from one another. Output from the cells is sent to a processor to determine the speed and direction of rotation of the motor.

17 Claims, 1 Drawing Sheet

GEAR MOTOR ACTIVATING A MOTOR VEHICLE FUNCTIONAL MEMBER

The present invention relates to a geared motor for activating a functional member of a motor vehicle.

Numerous geared motors of this type are already known in the prior art, which comprise a direct-current electric motor, at the end of which is arranged a reducer casing, in which are arranged means for detecting the speed and direction of rotation of the motor, the said means comprising a coded magnetic wheel associated with the output shaft of the motor and at least two Hall effect cells which are offset relative to one another and the output of which is designed to be connected to signal processing/conditioning means.

Such geared motors are used, for example, for ensuring the activation of electric operated windows, electric operated sliding roofs or the like of motor vehicles.

It is necessary, for various reasons, to know the speed and direction of rotation of this motor, in order to control the functioning of the latter.

Means have therefore been installed in these motors which make it possible to record these parameters using a coded magnetic wheel fastened, for example, to the output shaft of the motor, this coded magnetic wheel being associated with at least two Hall effect cells.

Reference may be made, for example, to the documents U.S. Pat. Nos. 4,857,784, 5,422,551 and 5,500,585 which describe such structures.

However, in all the geared motors of the prior art, the Hall effect cells are arranged opposite the peripheral edge of the coded magnetic wheel and in alignment with the latter.

This arrangement, then, has some disadvantages, particularly in terms of the accuracy required for mounting these Hall effect cells and of the resulting bulk of the geared motor.

In fact, it is known that, in order to function correctly, these Hall effect cells must be arranged with relatively high accuracy in relation to the coded magnetic wheel, so that, in order to obtain such accurate positioning, it is necessary for the manufacture and assembly of the geared motors to be controlled accurately.

Moreover, arranging the Hall effect cells in the extension of the coded magnetic wheel increases the radial bulk of this geared motor.

The object of the invention is, therefore, to solve these problems.

For this purpose, the subject of the invention is a geared motor for activating a functional member of a motor vehicle, of the type comprising a direct-current electric motor, at the end of which is arranged a reducer casing, in which are arranged means for detecting the speed and direction of rotation of the motor, the said means comprising a coded magnetic wheel associated with the output shaft of the motor and at least two Hall effect cells which are offset relative to one another and the output of which is designed to be connected to signal processing/conditioning means, characterized in that the Hall effect cells are placed opposite at least part of a lateral face of the coded wheel between the latter and means for concentrating the magnetic flux.

The invention will be better understood with the aid of the following description given purely by way of example and made with reference to the accompanying drawings, in which:

FIG. 1 shows, specifically, a geared motor for activating a functional member of a motor vehicle, the said motor being designated by the general reference 1.

Such a geared motor comprises, in general terms, a direct-current electric motor, designated by the general reference 2, at the end of which is arranged a reducer casing designated by the general reference 3.

The casing may, for example, be produced from plastic, and means for detecting the speed and direction of rotation of the motor are arranged in the latter.

These means are designated by the general reference 4 in this figure.

Figure 3:
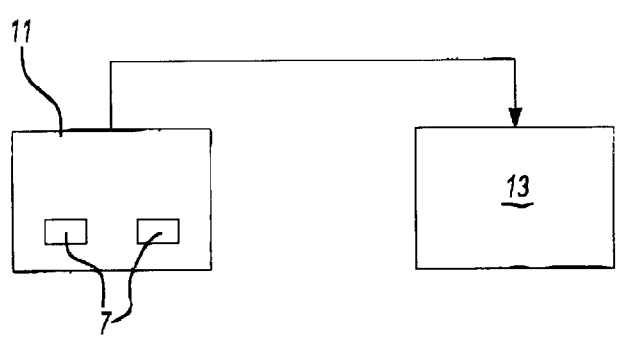
FIG. 3 shows a schematic view of an exemplary embodiment of a connector and Hall effect cells connected to signal processing/conditioning means.

In fact, these means may comprise, in the conventional way, a coded magnetic wheel, designated by the general reference 5, associated with the output shaft 6 of the motor 2, and at least two Hall effect cells which are offset relative to one another and the output of which is designed to be connected to signal processing/conditioning means 13 (see FIG. 3) as is known in the art.

Figure 1:
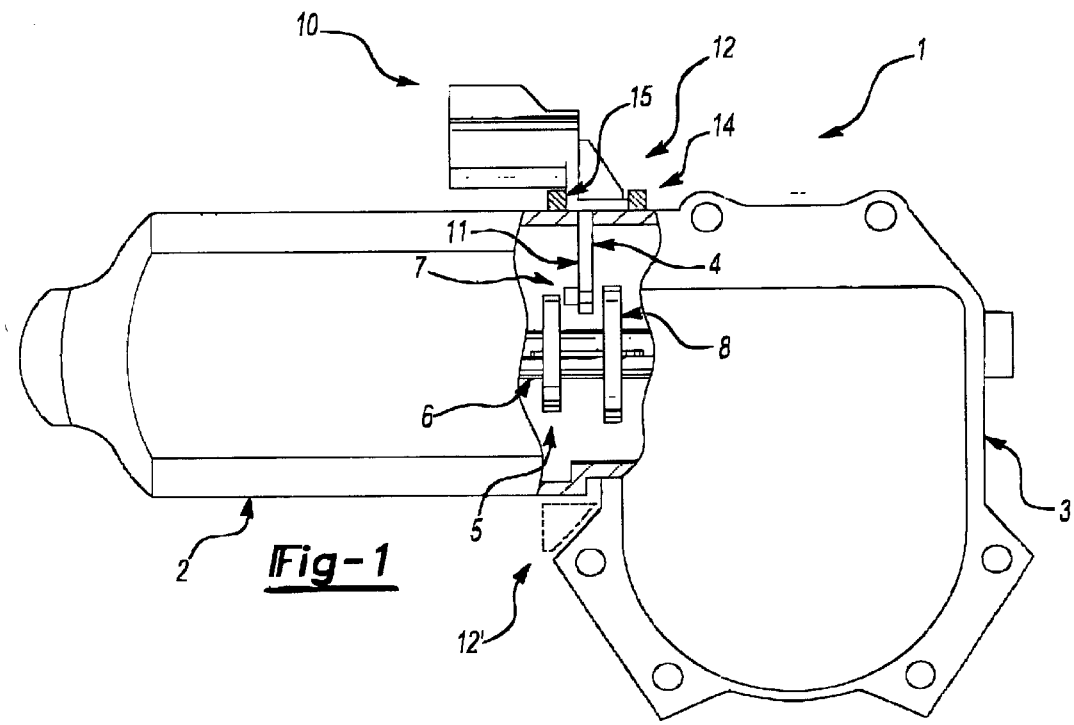
FIG. 1 shows a partly sectional diagrammatic view of an activating geared motor according to the invention.

FIG. 1 shows a single Hall effect cell, the latter being designated by the general reference 7.

According to the invention, the Hall effect cells are placed opposite at least part of a lateral face of the coded wheel 6 between the latter and means for concentrating the magnetic flux, which are designated by the general reference 8 in this figure.

It would be appreciated, then, that, instead of being arranged opposite the peripheral edge of this coded wheel, as in the prior art, in the geared motor according to the invention these Hall effect cells are arranged opposite a lateral face of this wheel.

In order to allow the optimum functioning of these cells, it is then necessary to provide means for concentrating the magnetic flux which are located behind these cells in relation to the coded magnetic wheel.

In fact, the Hall effect cells and the flux concentration means may be arranged level with the peripheral edge of this coded wheel, as illustrated.

Figure 2:
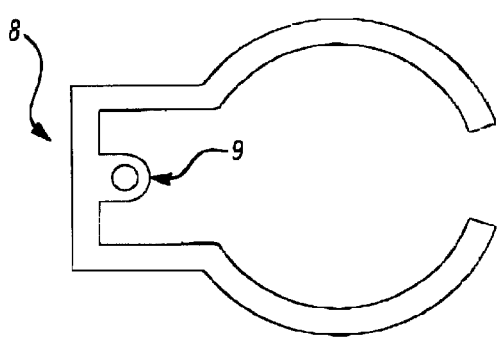
FIG. 2 shows a front view of an exemplary embodiment of means for concentrating magnetic flux which are involved in the construction of such a geared motor.

These means for concentrating the magnetic flux 8 may, for example, comprise at least one washer made of magnetic material, such as that illustrated in FIG. 2.

This FIG. 2 shows, specifically, the flux concentration washer 8 which is open at one of its ends in order to make it easier to mount it around the shaft of the motor, and which, at its other end, comprises means for fastening to the rest of the reducer casing.

These fastening means may, for example, comprise a hole 9 in this washer, the said hole being designed to engage around a stud located on the rest of the casing, in order to ensure the fastening of this washer.

Other embodiments of these means for concentrating the magnetic flux may, of course, be considered.

For example, the Hall effect cells 7 may be carried by a connector for connecting the motor to the rest of the circuits of the vehicle.

This connector is designated by the general reference 10 in this FIG. 1 and comprises, for example, a printed-circuit board, designated by the general reference 11, to which are fastened, for example, the Hall effect cells 7 and, it appropriate, means for feeding these and means for processing/conditioning the output signals from these, of conventional type.

For this purpose, the reducer casing 3 comprises at least one well for receiving this connector, this well being designated by the general reference 12.

The reducer casing 3 may comprise two opposite wells 12, 12' making it possible to ensure that the connector is received respectively in the upper part or in the lower part of the said casing, in order to adapt the configuration of the geared motor obtained to the configuration of that part of the vehicle which is intended for receiving this geared motor.

Conventionally, the connector 10 and the reducer casing 3 may comprise means for elastic snap-in attachment shown schematically at 14, and a gasket 15 may be arranged between the connector and the casing.

Other embodiments of this geared motor may, of course, be considered.

It will be appreciated, then, that the geared motor according to the invention has some advantages, as compared with the geared motors of the prior art, inasmuch as the special arrangement of the hall effect cells makes it possible, on the one hand, to reduce the radial bulk of the geared motor and, on the other hand, to achieve accurate detection of the direction and speed of rotation of the motor by means for concentrating the magnetic flux being associated with these cells.

What is claimed is:

1. Geared motor for activating a functional member of a motor vehicle comprising a direct-current electric motor (2), a reducer casing (3) arranged at one end of said motor and including means (4) for detecting the speed and direction of rotation of the motor, the said means comprising a coded magnetic wheel (5) associated with an output shaft (6) of the motor and at least two Hall effect cells (7) which are offset relative to one another and the output of which is designed to be connected to means for signal processing/conditioning the output, characterized in that the Hall effect cells (7) are placed opposite at least part of a lateral face of the coded wheel (5) between the wheel and means (8) for concentrating magnetic flux.

2. Geared motor according to claim 1, characterized in that the Hall effect cells (7) and the means for concentrating the magnetic flux (8) are arranged level with the peripheral edge of the coded wheel (5).

3. Geared motor according to claim 1, characterized in that the means for concentrating the magnetic flux comprise at least one washer (8) made of magnetic material.

4. Geared motor according to claim 1, characterized in that the means for concentrating the magnetic flux comprise means (9) for fastening to the rest of the reducer casing (3).

5. Geared motor according to claim 1, characterized in that the Hall effect cells are connected to a connector (10) for connecting the motor to the rest of the circuits of the vehicle.

6. Geared motor according to claim 5, characterized in that the Hall effect cells (7) are fastened to a printed-circuit board (11) which is connected to the connector (10) and on which are arranged the means for processing/conditioning the output signals from these.

7. Geared motor according to claim 5, characterized in that the reducer casing (3) comprises at least one well (12) for receiving the connector (10).

8. Geared motor according to claim 7, characterized in that the reducer casing (3) comprises two opposite wells for receiving the connector (10) in the upper part or the lower part of the said casing.

9. Geared motor according to claim 5, characterized in that the connector (10) and the reducer casing (3) comprise complementary elastic attachment means.

10. Geared motor according to claim 9, characterized in that a gasket is arranged between the connector (10) and the reducer casing (3).

11. A motor apparatus for controlling movement of a vehicle member comprising:

a motor having an output shaft defining an axis of rotation;

a reducer casing supported at one end of said motor;

a non-contact sensor assembly for detecting speed and direction of rotation of said motor including a coded magnetic wheel mounted for rotation about said axis and at least one Hall effect cell fixed relative to and placed opposite at least part of a lateral face of said wheel; and a magnetic flux concentration member mounted on an opposite side of said Hall effect cell from said wheel wherein said Hall effect cell generates a signal that varies with magnetic flux as said wheel rotates about said axis.

12. An apparatus according to claim 11 wherein said magnetic flux concentration member partially extends around said output shaft and is mounted to said casing.

13. An apparatus according to claim 11 including a processor for receiving said signal to determine the speed and direction of rotation of said motor.

14. An apparatus according to claim 11 wherein said sensor assembly is mounted within said casing.

15. A motor apparatus for controlling movement of a vehicle member comprising:

a motor having an output shaft defining an axis of rotation;

a reducer casing supported at one end of said motor;

a non-contact sensor assembly for detecting speed and direction of rotation of said motor including a coded magnetic wheel mounted for rotation about said axis and at least one Hall effect cell fixed relative to and placed opposite at least part of a lateral face of said wheel to generate a signal that varies with magnetic flux as said wheel rotates about said axis;

a connector supported by said casing and extending inwardly toward said axis wherein said Hall effect cell is mounted on said connector; and a magnetic flux concentration member positioned on an opposite said from said connector than said wheel.

16. An apparatus according to claim 15 wherein said connector is a printed circuit board for directing the signal to a processor.

17. An apparatus according to claim 11 wherein said at least one Hall effect cell is a plurality of Hall effects cells placed opposite at least part of said lateral face of said wheel and spaced apart from one another.

* * * * *